United States Patent [19]
Bormann

[11] Patent Number: 5,203,437
[45] Date of Patent: Apr. 20, 1993

[54] TROLLEY BRUSH

[75] Inventor: Uwe Bormann, Ruemmingen, Fed. Rep. of Germany

[73] Assignee: Wampfler GmbH, Weil am Rhein-Maerkt, Fed. Rep. of Germany

[21] Appl. No.: 680,516

[22] Filed: Apr. 4, 1991

[30] Foreign Application Priority Data

Apr. 27, 1990 [DE] Fed. Rep. of Germany ... 9004828[U]

[51] Int. Cl.⁵ .............................................. B60L 5/30
[52] U.S. Cl. ........................................ 191/58; 191/70
[58] Field of Search .................. 191/45 R, 49, 50, 58, 191/60.2, 60.3, 60.4, 66, 68, 70

[56] References Cited

U.S. PATENT DOCUMENTS

| 442,002 | 12/1890 | Adams | 191/60.2 |
| 448,172 | 3/1891 | Wightman | 191/70 X |
| 569,772 | 10/1896 | Short | 191/70 |
| 970,981 | 9/1910 | Blackstone | 191/60.2 |
| 1,087,328 | 2/1914 | Siwak | 191/60.2 |
| 2,616,992 | 11/1952 | Lewis | 191/70 |
| 3,396,246 | 8/1968 | Roney | 191/58 |

Primary Examiner—Michael S. Huppert
Assistant Examiner—Scott L. Lowe
Attorney, Agent, or Firm—Pascal & Associates

[57] ABSTRACT

A trolley brush for sliding electrical connection with a live rail, which is of simple construction and maintains precise alignment of the sliding contact with the live rail with relative change of position between the live rail and the base of the trolley brush. The trolley brush is comprised of a base, an arm attached thereto which can be turned about a first axis which is almost at right angles to the longitudinal axis of the arm and a sliding contact support attached to the arm which can be turned about a second axis which is almost perpendicular to the first axis and to the longitudinal axis. The base has a slot-like recess whose plane extends in the plane formed by the first axis and the longitudinal axis, the recess having a limiting first wall. A calotte is located on the inside of the first wall, a cambered projection being provided on the arm, engaging in the calotte, whereby the projection pivots the arm in the plane of the recess and about the first axis, a spring being provided between the base and arm, the spring acting upon the arm at a distance from the projection, holding the projection and the calotte engaged and turning the arm in the direction of the sliding contact line.

14 Claims, 3 Drawing Sheets

TROLLEY BRUSH

FIELD OF THE INVENTION

This invention relates to a trolley brush for sliding electrical connection with a live rail.

DESCRIPTION OF THE PRIOR ART

In an embodiment as known in the prior art, a trolley brush is fastened by means of a base to a jib which runs diagonally to a live rail. The jib has a square cross-section. A bushing which also has a square bore is provided on the base. The swing between the bushing and the base is limited, a spring being provided which determines a central position of the base relative to the bushing and thus relative to the jib.

The base has two bearing eyes via which the arm of the trolley brush is hinged by means of a bolt. This bolt extends at right angles to the jib. The arm can be swiveled to a limited degree relative to the base, whereby the central position of the arm is determined by a further spring. The arm carries a sliding contact support, which sliding contact support is sluable relative to the arm to a limited degree about an axis which runs parallel to the axis of the jib. A spring extending between the sliding contact support and the arm fixes the normal position of the sliding contact support relative to the arm.

With this construction, the sliding contact can remain in contact with the sliding contact line, even when the jib is displaced laterally to the live rail and/or when the distance between the jib and the live rail changes.

However there is a disadvantage in the complicated construction involving the base which facilitates turning of the arm in two axes at right angles to one another.

In another prior art structure, the base is rigidly connected to the jib. In order to detect varying distances between live rail and jib, the arm is designed as a parallelogrammic guide rod, whereby two guide arms are connected to one another via a spring which pushes the sliding contact support in the direction of the live rail. This construction is also complex.

SUMMARY OF THE INVENTION

It is an object of the present invention to construct the trolley brush in such a way that, with a simple construction, a precise alignment of the sliding contact to the live rail can be ensured when there are relative changes of position between the rail and the base.

According to an embodiment of the invention a trolley brush for a sliding contact line is comprised of a base, an arm attached thereto which can be turned about a first axis which is almost at right angles to the longitudinal axis of the arm and a sliding contact support attached to the arm which can be turned about a second axis which is almost perpendicular to the first axis and to the longitudinal axis, the base having a slot-like recess whose plane extends in the plane formed by the first axis and the longitudinal axis, the recess having a limiting first wall, a calotte on the inside of the first wall, a cambered projection being provided on the arm engaging in the calotte, whereby the projection pivots the arm in the plane of the recess and about the first axis, a spring being provided between the base and the arm, the spring acting upon the arm at a distance from the projection, holding the projection and the calotte engaged and turning the arm in the direction of the sliding contact line.

BRIEF INTRODUCTION TO THE DRAWINGS

Embodiments of the invention are described in greater detail below, with reference to the following drawings, in which.

DETAILED DESCRIPTION OF THE INVENTION

Figure 1:
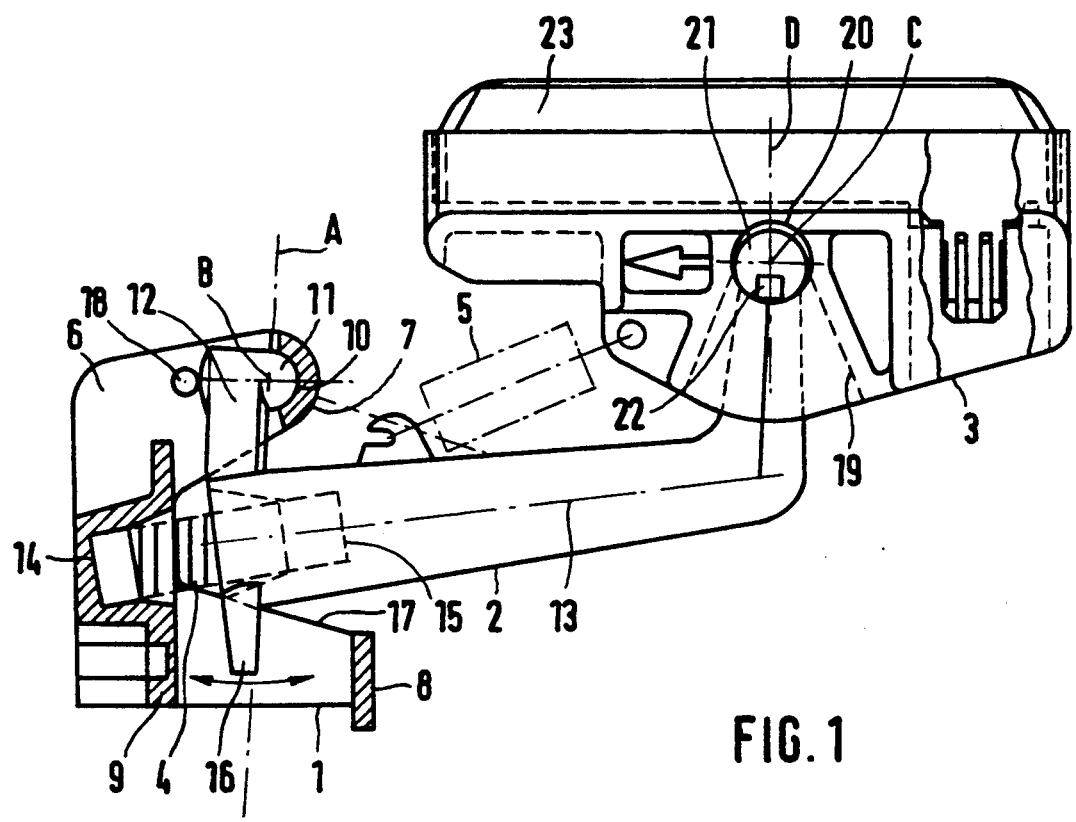
FIG. 1 is a side elevation of a first embodiment of the invention.

As shown in FIG. 1, the trolley brush is comprised of a base 1, an arm 2, a sliding contact support 3 and two springs 4, 5. The base i has a slot-shaped recess 6, the walls limiting the slot-like recess being connected to one another by three wall parts 7, 8, 9. The first wall part 7 has a spherical calotte 10 on the inside. A cambered projection 11 engages in the spherical calotte 10, the projection being located on an attachment 12 of the arm 2 which runs almost at right angles to the longitudinal axis 13 of the arm. The spring 4 in the form of a pressure spring is fixed, in each case, in a bore 14, 15 on the third wall part 9 of the base 1 and arm 2. In extension of attachment 12, arm 2 has a further attachment 16 which can abut against wall part 8.

Seen in the plane of the slot-shaped recess 6, the base 1 has an almost U-shaped cross-section. Arm 2 extends in the region of an opening 17 thus formed.

In FIG. 1, the trolley brush is shown in its normal position in which the pressure spring 4 exerts, counterclockwise, a torque on the arm 2, as a result of which the sliding contact support 3 is pressed against a live rail (which is not shown). If the distance between the base 1 and sliding contact line on the live rail changes, then arm 2 carries out a swinging motion about the centre of the calotte, as indicated by the semicircular double arrow. This swing is limited by attachment 16 coming to rest either against the second wall part 8 or against the third wall part 9. If one shifts the sliding contact line and the base 1 laterally relative to one another, then arm 2 can turn about an axis A in base 1. Thus, rotatability of arm 2 relative to the base is facilitated, on the one hand, about axis A and, on the other hand, about axis B which extends orthogonally thereto. Attachments 12, 16, of course, have play relative to the walls limiting recess 6.

At a distance from calotte 10, the base has a pin 18 against which the back side of attachment 12, curved into the shape of a circular arc, comes to rest.

Instead of the pressure spring 4, a tension spring can be provided which extends between the first wall part 7 and about the centre of arm 2. Alternatively, it is possible to place calotte 10 on the third wall part 9 in which the cambered projection engages in the extension of arm 2. In this case, a pressure spring should be provided between the third wall part 9 and attachment 16 or, alternatively, the above described tension spring could be used.

The bent end of arm 2 engages in a wedge-shaped slot 19 of the sliding contact support 3, the wedge-shaped slot 19 leading to a round bore 20 which extends diagonally to it. The bent end of arm 2 has a circular cylindrical head 21 which engages in bore 20. A wedge surface 22 is provided on at least one of the face surfaces of the head 21, the wedge surface increasing from the centre outward and coming to rest against the wall of bore 20, thus securing the sliding contact support 3 on arm 2. The sliding contact support 3 can thus be turned about an axis C relative to arm 2, the axis C running parallel to axis B. Since there is play between bore 20 and head 21, it is also possible to turn the sliding contact support 3 to a limited degree about axis D which extends at right angles to axis C. The normal position of sliding contact support 3 relative to arm 2 is determined by tension spring 5 which extends between arm 2 and sliding contact support 3 and is attached to each of them.

Figure 2:
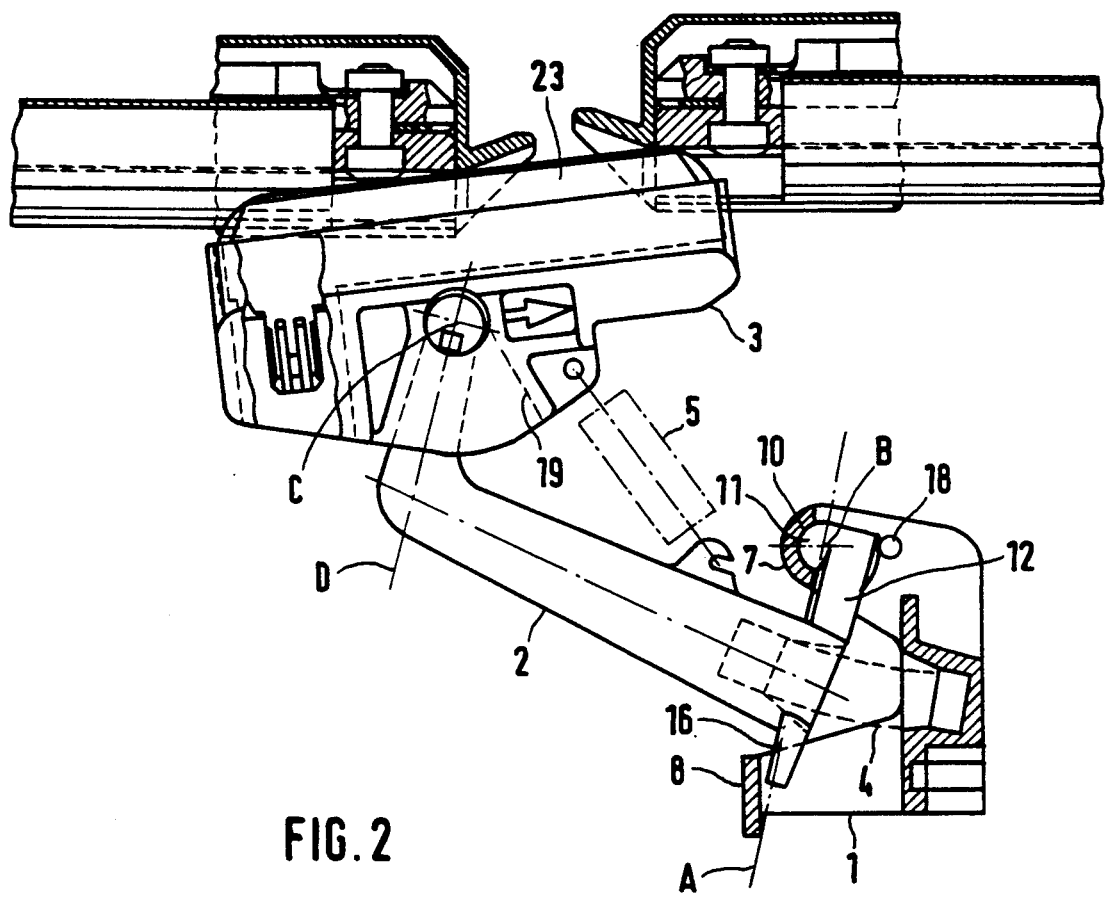
FIG. 2 is a side elevation of the first embodiment, seen from the opposite side while ends of two adjacent live rails are being passed over.

FIG. 2 shows the passage of the trolley brush between two adjacent sliding contact lines. The distance of the base 1 to the sliding contact lines is greater than as shown in FIG. 1, so that arm 2 is swung from spring 4 in the direction of the wall part 8. The two sliding contact lines are shifted with respect to height relative to one another, whereby the resulting displacement is absorbed by the swing of sliding contact support 3 about axis C.

If there is a displacement between base part 1 and the sliding contact lines diagonally to the plane of the drawing, then this displacement is equalized by the swing of arm 2 relative to base part 1 about axis A and the swing of sliding contact support 3 relative to arm 2 about axis D.

Figure 3:
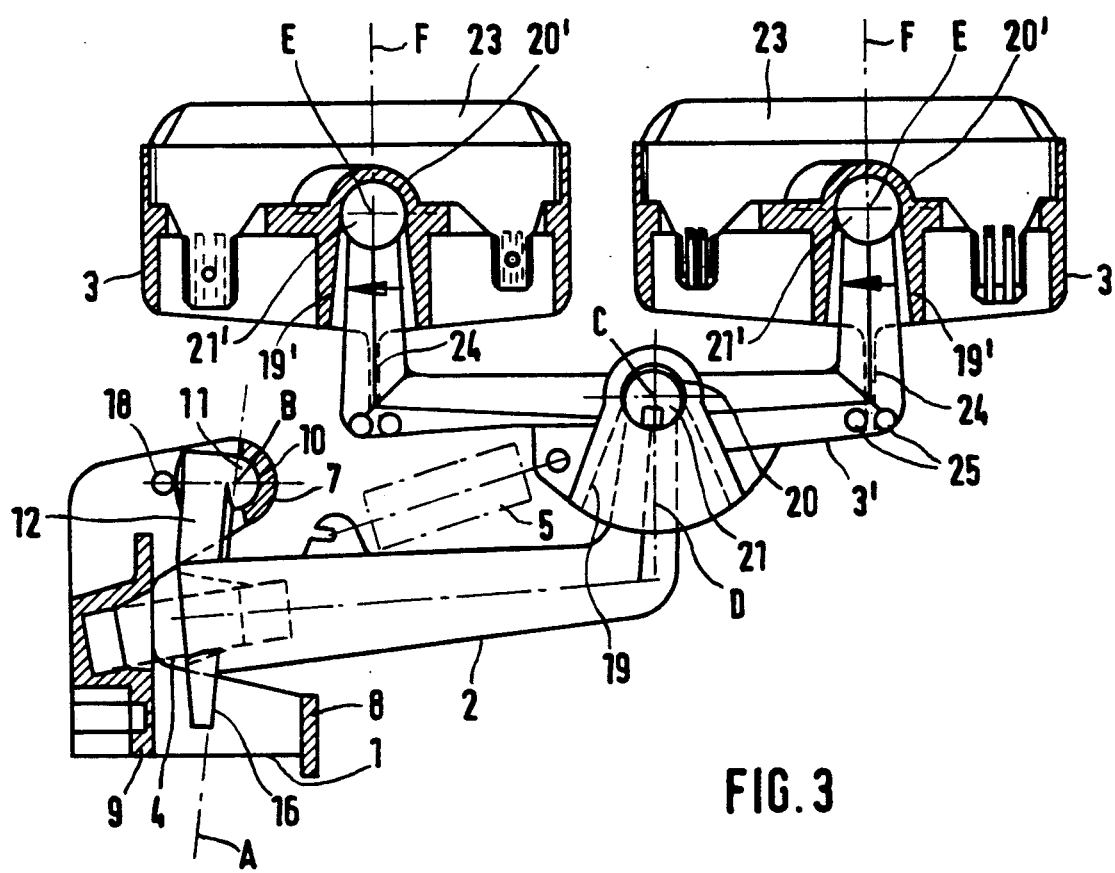
FIG. 3 is a side elevation of a second embodiment illustrated partially in cross-section.

In the embodiment shown in FIGS. 1 and 2, the sliding contact support 3 is the holder of a sliding contact 23. In the embodiment shown in FIG. 3, the sliding contact support 3' is U-shaped and carries a holder 3 for each sliding contact 23 at its free sides. The connection between arm 2 and the sliding contact support 3' is the same as described in FIGS. 1 and 2. This is also true for the connection between sliding contact support 3' and holders 3 in FIG. 3. The wedge-shaped slots 19' in FIG. 3 are simply more acutely angled than slot 19 in FIGS. 1 and 2. The holders 3 can be slightly turned relative to the sliding contact support 3' about axes E and F which run at right angles to one another. In order to secure the neutral position, each holder 3' has a spring lug 24 on both sides, the ends of which are held between two pins 25 of support 3 respectively.

Consequently each free holder side has a circular cylindrical head 21' which engages in the bore 20' and which has, on one of its face surfaces, a wedge surface which points to the slot 19' and which interlocks with the bore wall. Preferably the bores 20, 20' each has a larger diameter than the diameter of the head 21, 21'.

I claim:

1. A trolley brush for a sliding contact line comprising:
   a base having a slot-like recess with a limiting first wall and a calotte on the inside of said first wall,
   an arm attached to said base having a cambered projection engaging in said calotte, whereby when said trolley brush is in operation, said projection can pivot said arm around the center of said calotte about a first axis which is almost at a right angle to a longitudinal direction along the length of said arm and in said recess about a second axis which is a right angle to said first axis,
   a spring being provided between said base and said arm, said spring acting upon said arm at a distance from said projection, holding said projection and said calotte engaged and turning said arm about said second axis in a direction of said sliging contact line,
   and a sliding contact support attached to said arm which can be turned about a third axis which runs parallel to said second axis and to a limited degree about a fourth axis which extends at a right angle to said third axis and which runs parallel to said first axis.

2. A trolley brush as defined in claim 1, further including a second wall in said base which limits said recess on the side of the arm opposite the first wall, the arm having a further attachment which is pressed against the second wall by the spring.

3. A trolley brush as defined in claim 1, in which said first wall limits said recess in the direction of the arm, the projection being located on a first attachment to the arm which extends almost at a right angle to said longitudinal direction and which points in the direction of the sliding contact line.

4. A trolley brush as defined in claim 3, the base and arm having coaxial bores facing each other, said spring being a pressure spring which is supported in said bores.

5. A trolley brush as defined in claim 3, in which the base has a stay, at a distance from the calotte, and said first attachment extends with play between the calotte and said stay.

6. A trolley brush as defined in claim 5, in which said first attachment has, in the region of said stay, a round shape which comes to rest against said stay.

7. A trolley brush as defined in claim 3, in which said spring is a compression spring which is in contact with a third at a distance from the base and extends to contact the arm.

8. A trolley brush as defined in one of claims 1 or 7, in which the sliding contact support has a wedge-shaped slot which ends in a round bore and the arm has a bent and has a circular cylindrical head which engages in the bore.

9. A trolley brush as defined in claim 8, in which the sliding contact support has the holder for a sliding contact.

10. A trolley brush as defined in claim 8, in which the bore has a layer diameter than the diameter of the head, thereby enabling the sliding contact support to turn about the fourth axis to a limited degree.

11. A trolley brush as defined in claim 8, in which the sliding contact support has two limbs and is U-shaped; and each limb carries a holder for a sliding contact.

12. A trolley brush as defined in claim 11, each holder has a holder slot which leads into a round holder bore and, each limb has a circular cylindrical head which engages in the holder bore.

13. A trolley brush as defined in claim 12, further including spring biasing means for maintaining said holders generally perpendicular to each limb, respectively.

14. A trolley brush as defined in claim 12, each holder in which bore has a larger diameter than its corresponding limb's the diameter of the head.

* * * * *